US012682652B2

(12) United States Patent
Bruns et al.

(10) Patent No.: US 12,682,652 B2
(45) Date of Patent: Jul. 14, 2026

(54) METHOD FOR SPATIAL CHARACTERIZATION OF AT LEAST ONE VEHICLE IMAGE

(71) Applicant: CARIAD SE, Wolfsburg (DE)

(72) Inventors: Micha Bruns, Berlin (DE); Daniel Degenhardt, Berlin (DE)

(73) Assignee: CARIAD SE, Wolfsburg (DE)

( * ) Notice: Subject to any disclaimer, the term of this patent is extended or adjusted under 35 U.S.C. 154(b) by 571 days.

(21) Appl. No.: 17/799,242

(22) PCT Filed: Jan. 13, 2021

(86) PCT No.: PCT/EP2021/050585
§ 371 (c)(1),
(2) Date: Aug. 11, 2022

(87) PCT Pub. No.: WO2021/160362
PCT Pub. Date: Aug. 19, 2021

(65) Prior Publication Data
US 2023/0087686 A1      Mar. 23, 2023

(30) Foreign Application Priority Data

Feb. 13, 2020    (DE) ........................ 10 2020 103 741

(51) Int. Cl.
*G06K 9/00*      (2022.01)
*G06T 7/70*      (2017.01)
(Continued)

(52) U.S. Cl.
CPC ................ *G06V 20/58* (2022.01); *G06T 7/70* (2017.01); *G06V 10/26* (2022.01); *G06V 10/454* (2022.01);
(Continued)

(58) Field of Classification Search
None
See application file for complete search history.

(56) References Cited

U.S. PATENT DOCUMENTS

2019/0317519 A1    10/2019  Chen
2020/0219316 A1 *   7/2020  Baik ......................... G06T 7/75
(Continued)

FOREIGN PATENT DOCUMENTS

WO      WO 2018184963 A2    10/2018
WO      WO 2018204656 A1    11/2018

OTHER PUBLICATIONS

International Search Report and Written Opinion, mailed Apr. 19, 2021, for International Patent Application No. PCT/EP2021/050585. (6 pages).
(Continued)

*Primary Examiner* — Wei Wen Yang
(74) *Attorney, Agent, or Firm* — Seed Intellectual Property Law Group LLP

(57)            ABSTRACT
A method is provided for the spatial characterization of at least one vehicle image of image information, wherein the image information encompasses the vehicle image of an external vehicle and an environment image of an environment of the external vehicle. The method comprises: determining a bounding box for the vehicle image, in order to use the bounding box for a delimiting of the vehicle image from the environment image, determining a splitting line for the bounding box, in order to use the splitting line for a partitioning of the vehicle image into at least two vehicle sides, determining the spatial characterization with the aid of the bounding box and the splitting line, wherein at least one evaluation means based on machine learning, especially a neural network, is used for the determining of the bounding box and the splitting line.

15 Claims, 8 Drawing Sheets

(51) Int. Cl.

| | |
|---|---|
| *G06V 10/26* | (2022.01) |
| *G06V 10/44* | (2022.01) |
| *G06V 10/764* | (2022.01) |
| *G06V 10/82* | (2022.01) |
| *G06V 20/58* | (2022.01) |

(52) U.S. Cl.
CPC ............ *G06V 10/764* (2022.01); *G06V 10/82* (2022.01); *G06T 2207/30236* (2013.01); *G06T 2207/30252* (2013.01); *G06V 2201/08* (2022.01)

(56) References Cited

U.S. PATENT DOCUMENTS

| | | | |
|---|---|---|---|
| 2021/0042535 A1* | 2/2021 | Abbott ................. | G06V 20/588 |
| 2021/0118147 A1* | 4/2021 | Chan ................... | G06V 10/764 |
| 2021/0342600 A1* | 11/2021 | Westmacott ........ | G06F 18/2148 |

OTHER PUBLICATIONS

Li et al., "Stereo R-CNN based 3D Object Detection for Autonomous Driving," 2019 IEEE/CVF Conference on Computer Vision and Pattern Recognition (CVPR), Long Beach, CA, USA, Jun. 15-20, 2019, pp. 7644-7652.

Li et al.,"GS3D: An Efficient 3D Object Detection Framework for Autonomous Driving," 2019 IEEE/CVF Conference on Computer Vision and Pattern Recognition (CVPR), Long Beach, CA, USA, Jun. 15-20, 2019, pp. 1019-1028.

Liu et al., "SSD: Single Shot MultiBox Detector," Dec. 29, 2019, URL=https://arxiv.org/abs/1512.02325, download date Sep. 28, 2023. (17 pages).

Mousavian et al., "3D Bounding Box Estimation Using Deep Learning and Geometry," Apr. 10, 2017, URL=https://arxiv.org/abs/1612.00496, download date Sep. 28, 2023. (10 pages).

Ren et al., "Faster R-CNN: Towards Real-Time Object Detection with Region Proposal Networks," Jan. 6, 2016, URL=https://arxiv.org/abs/1506.01497, download date Sep. 28, 2023. (14 pages).

* cited by examiner

METHOD FOR SPATIAL CHARACTERIZATION OF AT LEAST ONE VEHICLE IMAGE

BACKGROUND

Technical Field

Embodiments of the present invention relate to a method for the spatial characterization of at least one vehicle image. Moreover, embodiments of the invention relate to a computer program.

Description of the Related Art

Object detectors for vehicles are known in the prior art, in order to use recorded image information of a vehicle camera to detect the surroundings of the vehicle.

Methods of this kind serving for object detection are known from documents WO 2018/184963 A2 and WO 2018/204656 A1. In these it is disclosed that camera images are recorded at one vehicle and they can be evaluated by means of a neural network. In this way a bounding box can be determined for detected vehicles. It is also possible for this bounding box to comprise multiple quadrilateral shapes, characterizing the rear or front region and side region of the detected vehicle.

One shortcoming of the known solutions is that the three-dimensional reconstruction of the detected vehicles, i.e., the determination of a three-dimensional posture, is still somewhat complicated and unreliable.

BRIEF SUMMARY

Therefore, one problem to be solved is to eliminate at least some of the above described shortcomings. In particular, the problem is to provide a better possibility for the spatial characterization of the detected vehicles.

Further features and details will emerge from the claims, the specification, and the drawings. Features and details which are described in connection with methods also hold naturally in connection with the computer programs, and vice versa, so that a mutual referral is always possible or can be made for the disclosure of the individual aspects of the embodiments.

The problem is solved in particular by a method for spatial characterization, especially reconstruction, of at least one vehicle image of image information, such as a camera image. The method can be carried out specifically by a vehicle, especially by a processing device of the vehicle. For this, the vehicle can at first record the image information by means of a vehicle camera. The vehicle which records the image information and/or carries out the method described herein shall also be called in the following the ego vehicle. The ego vehicle is, for example, configured as a passenger car and/or a truck and/or as an autonomous vehicle. The image information, on the other hand, can comprise the at least one vehicle image of an external vehicle and furthermore at least one environment image of an environment of the external vehicle. The external vehicles are thus the vehicles in the surroundings of the ego vehicle, which can be recorded by the vehicle camera.

In some methods, the following steps can be carried out, such as in succession or in any desired sequence, and individual steps and/or all of the steps may be repeated:

determining a bounding box for the vehicle image, in order to use the bounding box for a delimiting of the vehicle image from the environment image, determining a splitting line for the bounding box, in order to use the splitting line for a partitioning of the vehicle image into at least two vehicle sides, especially a front and/or rear region of the external vehicle and a side region of the external vehicle, determining the spatial characterization with the aid of the bounding box and the splitting line.

For determining the bounding box and the splitting line it is possible to employ here at least one evaluation means based on machine learning, in particular at least one (artificial) neural network. The evaluation means can be based on machine learning, and thus on artificial intelligence, and it may be configured for example as a computer program, such as an artificial neural network. Other generic machine learning methods are also conceivable for the definition of the evaluation means. This application of the evaluation means, especially a neural network, has the advantage that the spatial characterization can be performed more technically easily and/or reliably. The evaluation means or neural network can be adapted, i.e., in particular trained to produce at least from the image information as input information the bounding box and the splitting line as output information. For this, it is possible to create in a training of the evaluation means or neural network a Ground Truth by manually characterizing the bounding box and the splitting line.

Moreover, it can be provided that the spatial characterization is performed as a three-dimensional reconstruction of the external vehicle from the vehicle image. The three-dimensional reconstruction can be accomplished, e.g., as a 3D posture of the external vehicle. In this way, it is possible to reliably establish a position and an orientation of the external vehicle relative to the ego vehicle.

Moreover, it is conceivable for the bounding box to be configured such that it separates the vehicle image from the environment image in order to completely mask the external vehicle. In other words, the bounding box can encapsulate the picture of the external vehicle entirely, but only include slight portions of the environment image.

Optionally, it may be possible for the splitting line to be configured such that it divides the vehicle image into a front and/or rear view of the external vehicle and a side view of the external vehicle. In this way, the orientation of the vehicle can be detected reliably.

Moreover, it can be provided that the splitting line is configured as a vertical line in relation to a ground surface on which the external vehicle is standing. It is assumed in this case that the ground surface is parallel to a horizontal line, and that the external vehicle is standing parallel to the ground surface, in order to perform a reliable reconstruction under this assumption.

Optionally, it may be possible to perform a classification of the external vehicle depicted by the vehicle image, making use of a classification result of the classification for determining the spatial characterization. This makes it possible to estimate a side ratio (aspect ratio) for the external vehicle. The classification can be done, e.g., at least for one of the following classes:

passenger car, truck, van, bus, bicycle.

Depending on the classification, a predefined side ratio can be selected and used for the further reconstruction. The predefined side ratio is for example stored in a data memory of the processing device.

Moreover, it is conceivable to use the classification result in order to determine a ratio between the width and the length of the depicted external vehicle. This side ratio may serve for determining the three-dimensional posture of the external vehicle.

In some embodiments, it can be provided that a three-dimensional back projection of the depicted external vehicle is performed from the vehicle image in order to determine the spatial characterization. For this, a calculation can be done by means of the defined splitting line and the bounding box in order to ascertain further information for the spatial characterization of the external vehicle.

Moreover, it is conceivable that the following steps are carried out for determining the bounding box and the splitting line:

applying the evaluation means or the at least one neural network with the image information as input, especially as input information, for the evaluation means or neural network, using at least one result, especially an output information, from the application of the evaluation means or the at least one neural network as the bounding box and as the splitting line.

In other words, the bounding box and the splitting line can be determined from the result. This enables an especially reliable and even automatic determination of the splitting line and the bounding box for the spatial characterization.

In some embodiments, it can be provided that the result contains information on a position of the splitting line in relation to the corresponding bounding box. Thus, it is possible to use the splitting line for a reliable delimiting of the side regions of the external vehicle.

In some embodiments, it can be provided that the result contains information as to the position of a side view of the external vehicle relative to the splitting line, i.e., in particular whether the side view is situated on the right or left from the splitting line. This is meaningful in order to resolve any ambiguity of the output information.

Moreover, it can be provided that, prior to determining the bounding box and the splitting line, the image information is recorded by a vehicle camera of another vehicle, hereinafter also called the ego vehicle. The recording in this case can be done repeatedly and/or automatically in order to detect the surroundings of the ego vehicle with the vehicle camera. A further advantage can be achieved if the recording of the image information is done during a drive to monitor the surroundings of the other vehicle, and then a detection of the external vehicle in the surroundings is done with the aid of the bounding box and the splitting line. Furthermore, it is possible to perform the spatial characterization in order to determine an orientation and/or position of the depicted external vehicle in relation to the other vehicle. Thus, the object detection can be supplemented with this additional information in order to characterize as comprehensively as possible the surroundings of the ego vehicle.

Some embodiments likewise relate to a computer program, comprising commands which, when the computer program is executed by a processing device, order the latter to carry out the steps of the method described herein. In this way, the computer program described herein brings the same advantages as have been described at length in regard to the method described herein. The aforementioned ego vehicle can comprise the processing device, which in particular stands in a data connection with the vehicle camera in order to transmit the image information. The processing device comprises, e.g., a processor, which fetches the computer program from a memory of the processing device in order to execute it.

BRIEF DESCRIPTION OF THE SEVERAL VIEWS OF THE DRAWINGS

Further advantages, features and details will emerge from the following specification, in which embodiments are described in detail, making reference to the drawings.

DETAILED DESCRIPTION

In the following figures, the same technical features, even in different embodiments, make use of the identical reference numbers.

Figure 1:
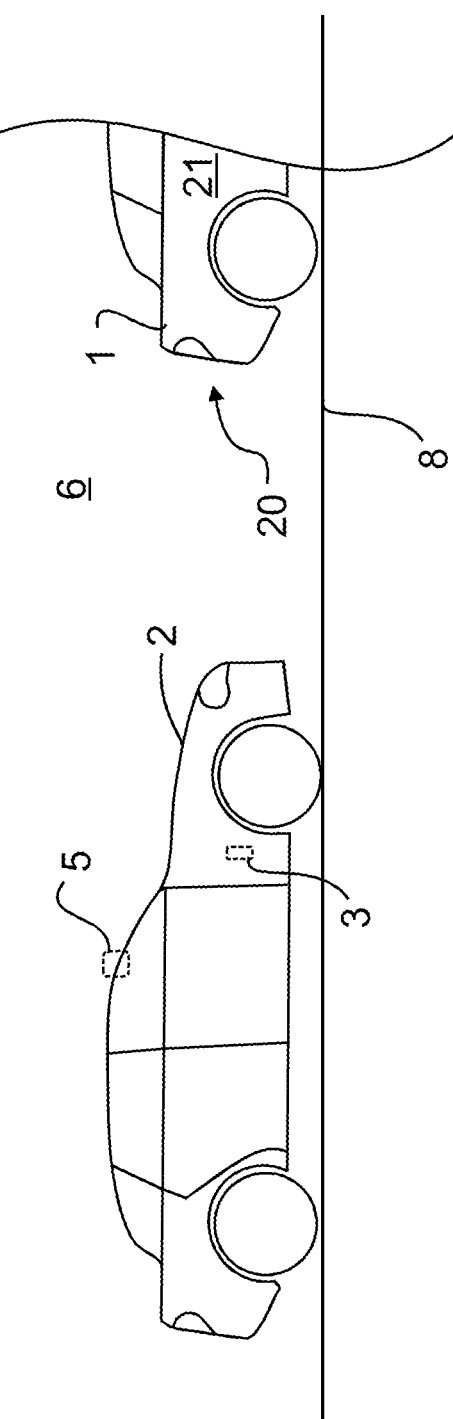
FIG. 1 shows a schematic representation of vehicles to illustrate methods described herein.

FIG. 1 shows schematically a situation in which image information 200 can be recorded by a vehicle camera 5 of a vehicle 2 (hereinafter also called the ego vehicle 2, for better distinguishing). For this, the vehicle camera 5 can record the environment 6 with at least one other vehicle 1, i.e., an external vehicle 1. In the example, the rear region 20 of the external vehicle 1 is recorded with priority and only part of the side region 21 of the external vehicle 1 is recorded. The vehicles 1, 2 are located on a ground surface 8, so that this can be assumed, for simplicity, to be parallel to the horizontal. Next, the image information 200 can be transmitted digitally to a processing device 3 in order to carry out the method described herein. The method described herein may serve for performing a spatial characterization of at least one vehicle image 30 of the external vehicle 1 in the image information 200, where the image information 200 encompasses the vehicle image 30 of the external vehicle 1 and an environment image 40 of an environment 6 of the external vehicle 1.

Figure 6:
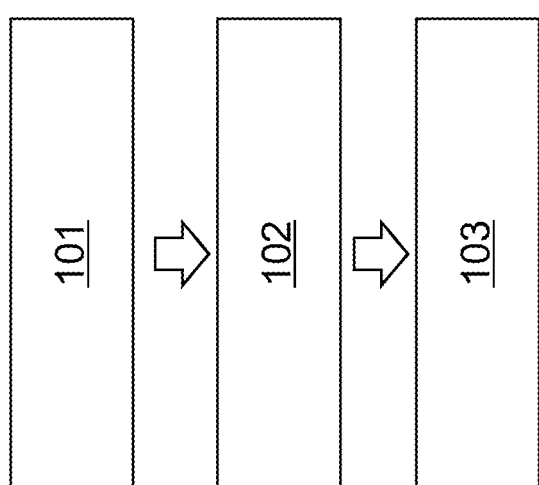

According to FIG. 6, a first step 101 of the method may involve determining a bounding box 230 for the vehicle image 30, in order to use the bounding box 230 for a delimiting of the vehicle image 30 from the environment image 40. After this, in a second step 102 of the method, a determination of a splitting line 240 is done for the bounding box 230, in order to use the splitting line 240 for a partitioning of the vehicle image 30 into at least two vehicle sides 20, 21, especially into a front and/or rear region 20 of the external vehicle 1 and a side region 21 of the external vehicle 1. Next, in a third step 103 of the method, the spatial characterization is determined with the aid of the bounding box 230 and the splitting line 240.

Figure 2:
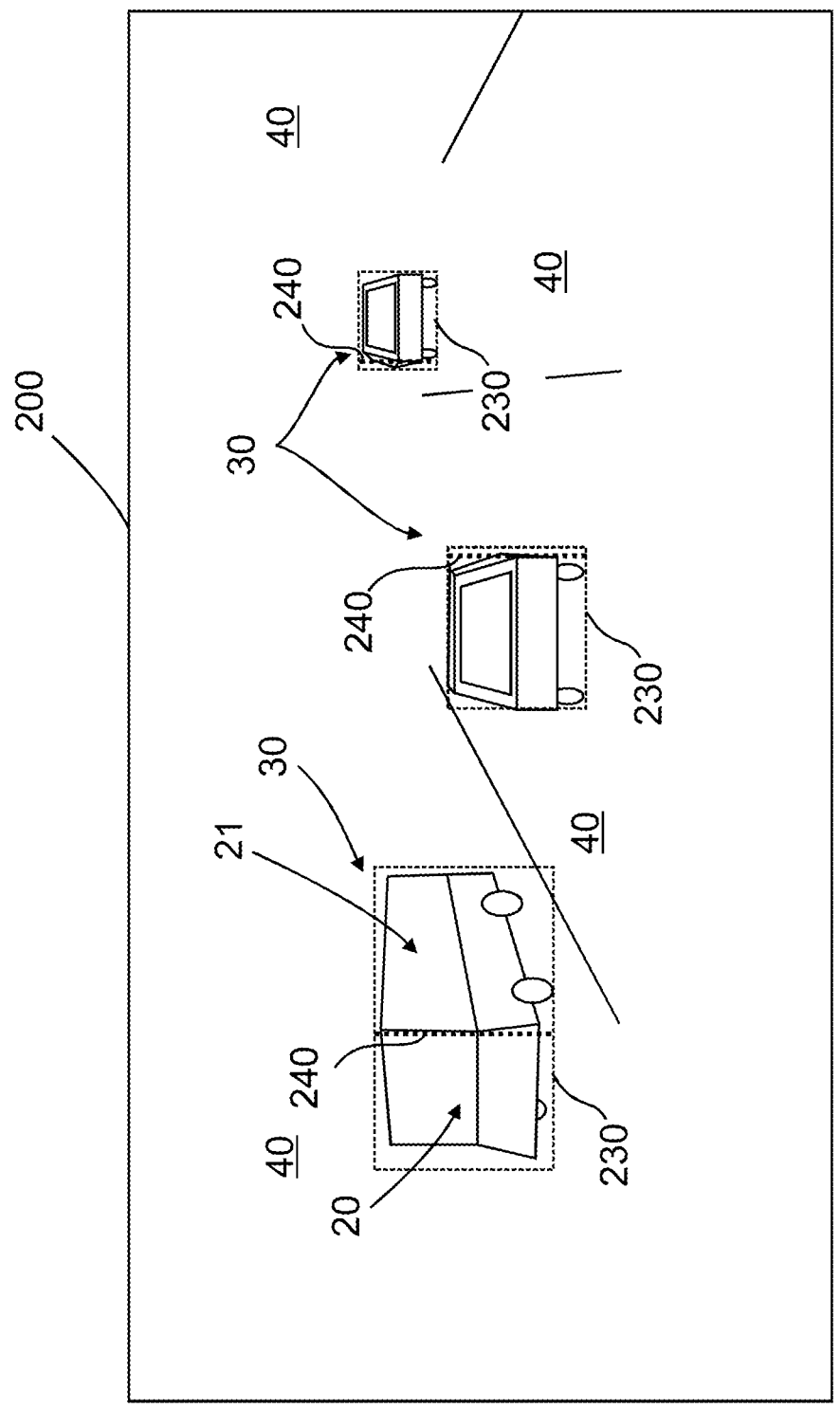
FIG. 2 shows a schematic representation of image information.

Thus, with a method as described herein it is possible to estimate the 3D position of an external vehicle 1 from pictures (i.e., the image information 200), characterized by the bounding box 230 and the splitting line describing the borders between the front/rear and side view 20, 21 (if both are visible). A characterization of the image information 200 is shown in FIG. 2. For this, it is possible to use an existing traditional object detector or a traditional method for the object detection, supplemented by introducing an additional parameter $dl_x$, expressing the position of a splitting line 240 in relation to its bounding box 230, in order to estimate the bounding box 230 with its corresponding splitting lines 240:

$$dl_x = pos_x(\text{dividing line}) - pos_x(\text{bounding box center}),$$

where $dl_x \in [pos_x(\text{left border}), pos_x(\text{right border})]$ are the parameters for the corresponding bounding box 230.

Figure 7:
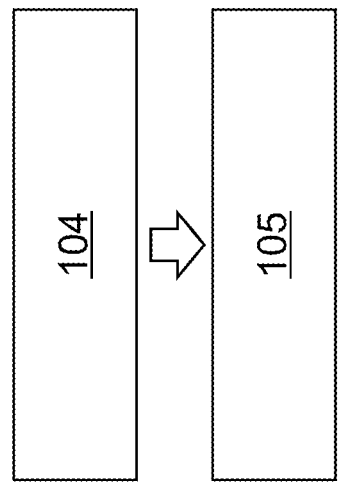
Figure 8:
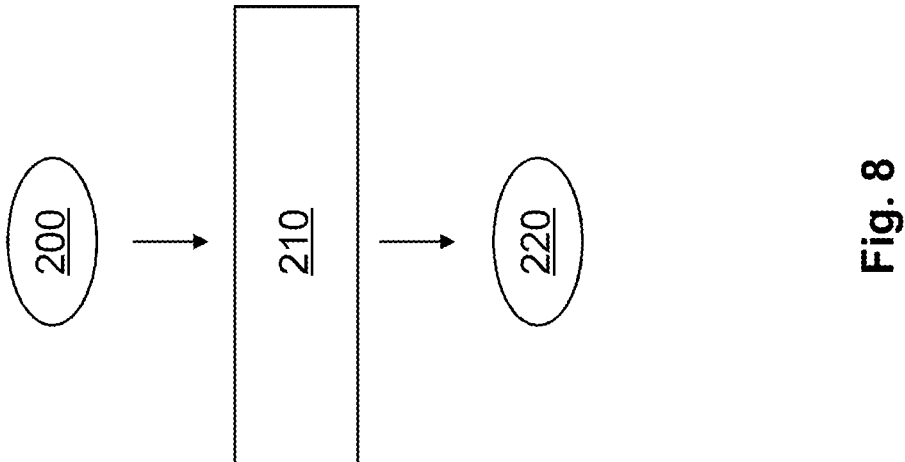

FIGS. 7 and 8 show that at least one evaluation means 210 can be employed for determining the bounding box 230 and the splitting line 240—here for example in the form of a neural network 210. For this, first of all one can apply 104 the at least one neural network 210 using the image information 200 as input 200 for the neural network 210. After this, one will use 105 at least one result 220 from the application 104 of the at least one neural network 210 as the bounding box 230 and as the splitting line 240. In other words, the result 220 can be used to determine the bounding box 230 and the splitting line 240. It is possible for the result 220 to contain information $dl_x$ about the position of the splitting line 240 in relation to the corresponding bounding box 230. The result 220 can also contain information $dl_{class}$ as to the position of a side view 21 of the external vehicle 1 relative to the splitting line 240.

The ambiguity of whether the side 21 of the external vehicle 1, i.e., the side view 21, may lie on the left or right of the splitting line 240, can be resolved in various ways. On the one hand, a binary parameter can be used:

$dl_{class}$=0, if the side is on the left of the splitting line; or
    1, if the side is on the right of the splitting line.

Another possibility is to encode the information about the position of the side view 21 in the information about the position of the splitting line 240 $dl_x$:

$dl_x =$
$pos_x$ (splitting line)$-pos_x$ (left border), if the side is at left of the splitting line; or
$pos_x$ (splitting line)$-pos_x$ (right border), if the side is at right of the splitting line,
where: $dl_x \in [-box_{width}, +box_{width}]$.

Here, zero represents the only visible front/rear side and the +/− width represents the only visible side. In order to achieve the same distribution of values for all object magnitudes, a normalization of $dl_x$ to the width of the corresponding objects can be done. With this definition, an object can be described by:

$$box=[\text{class}, pos_x(\text{center}), pos_y(\text{center}), \text{width}, \text{height}, dl_x]$$

The described method can be used with a traditional object detector, such as is disclosed in Liu, Wei, Dragomir Anguelov, Dumitru Erhan, Christian Szegedy, Scott Reed, Cheng-Yang Fu, and Alexander C. Berg, "SSD: Single Shot MultiBox Detector," arXiv:1512.02325 [cs], 7 Dec. 2015 and Shaoqing Ren, Kaiming He, Ross Girshick, Jian Sun, "Faster R-CNN: Towards Real-Time Object Detection with Region Proposal Networks," arXiv:1506.01497 [cs], 4 Jun. 2015.

FIG. 2 shows schematically image information 200 where the bounding box 230 and the splitting line 240 are indicated for better comprehension. It can be seen from this that the bounding box 230 can be designed to separate the vehicle image 30 from the environment image 40 in order to mask the external vehicle 1 entirely. It can likewise be seen that the splitting line 240 is designed to divide the vehicle image 30 into a front and/or rear view 20 of the external vehicle 1 and a side view 21 of the external vehicle 1. The splitting line 240 here is configured as a vertical line in relation to a ground surface 8 on which the external vehicle 1 is standing.

6

Figure 3:
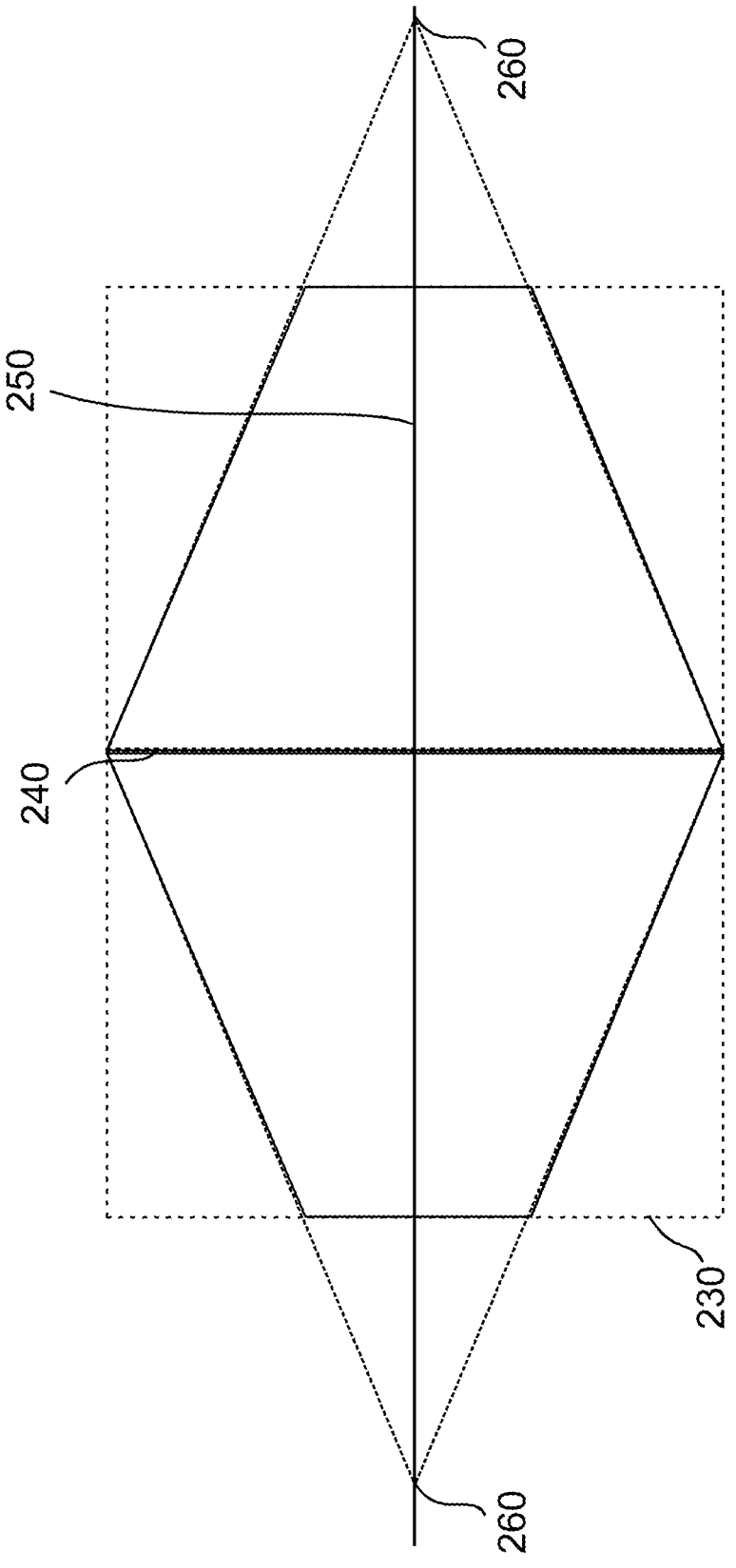
FIG. 3 shows a schematic representation of a bounding box and a splitting line.
Figure 4:
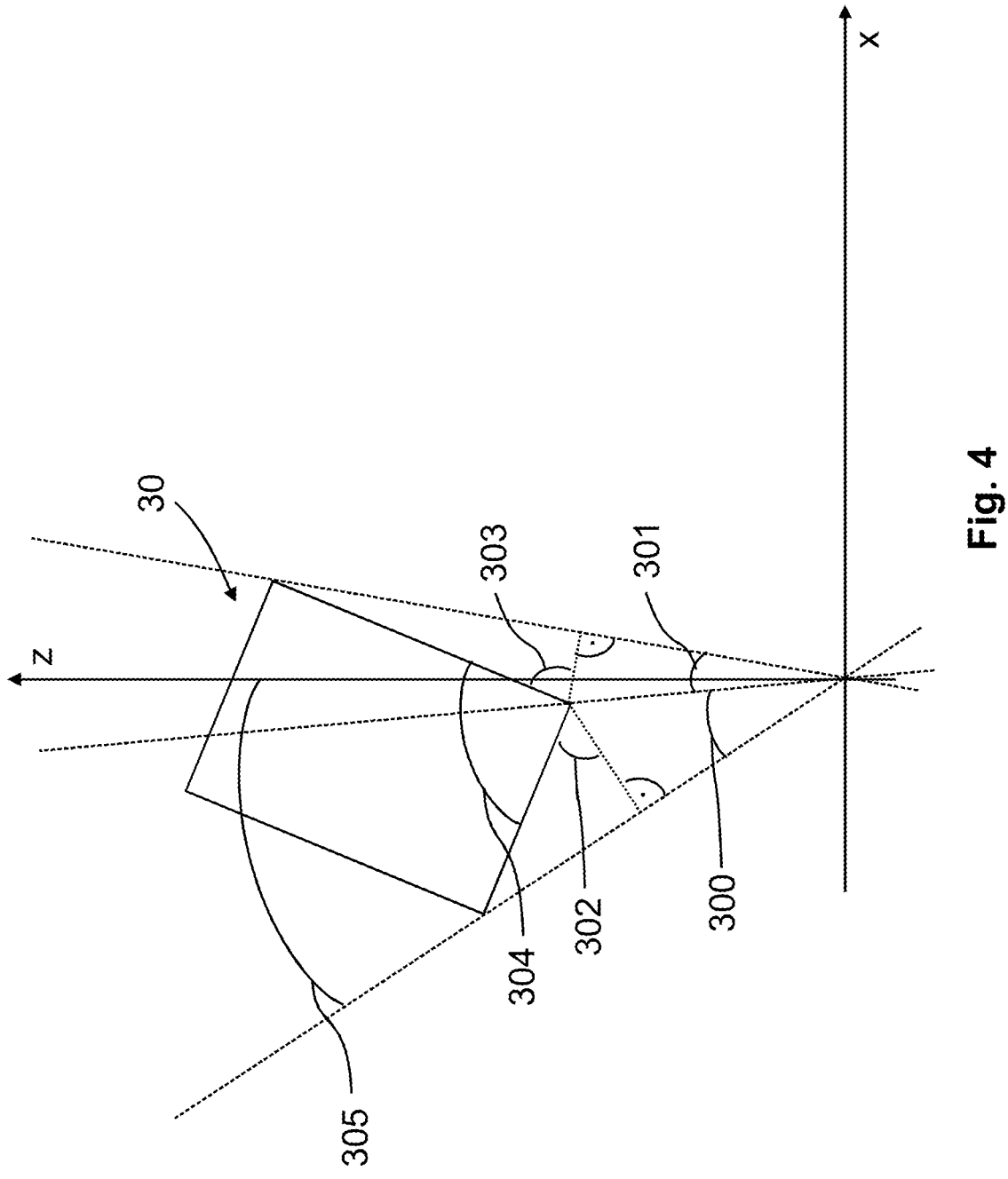
FIGS. 4-8 show schematic representations to illustrate steps of methods described herein.
Figure 5:
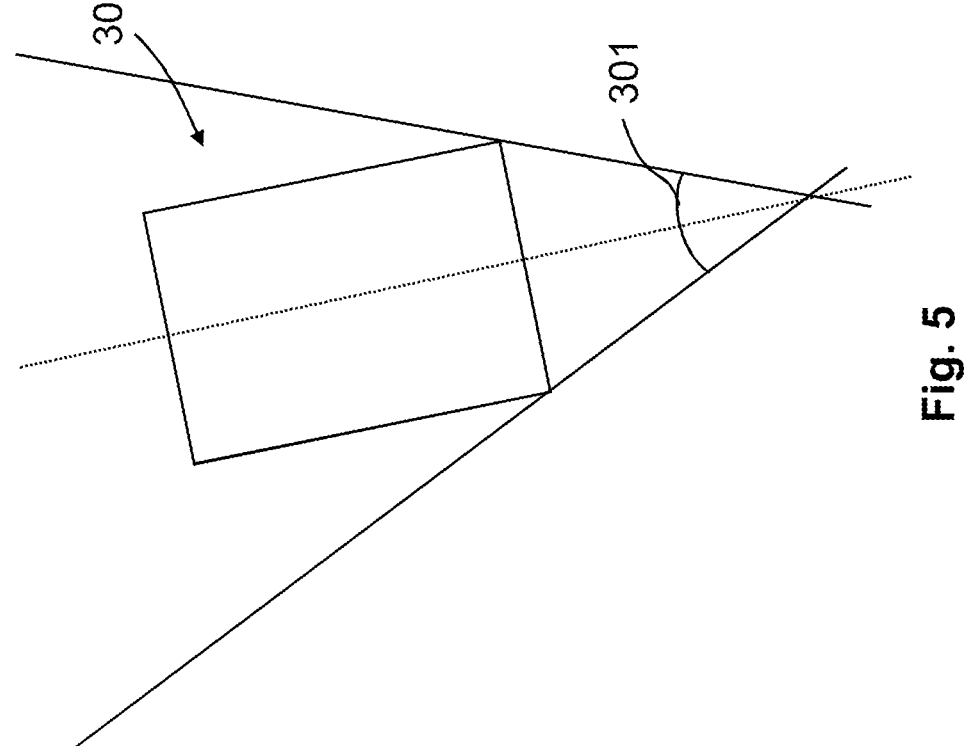

According to FIGS. 3 to 5, the spatial characterization can be performed as a three-dimensional reconstruction of the external vehicle 1 from the vehicle image 30. First of all, one may consider the general case where the front/rear view 20 and the side view 21 are visible in the image information 200. If the bounding box 230 and the corresponding splitting line 240 are indicated in distorted image coordinates, they are at first transformed into virtual camera coordinates. It follows, from the assumption of a parallel arrangement of the external vehicle 1 with respect to the ground surface 8, that for the resulting bounding box 230 the left side, the right side, and the splitting line 240 should be vertical (parallel to the y-axis). This is illustrated in FIG. 3, where the horizontal line 250 and the FOE (focus of expansion) are also indicated. The FOE here is located on different sides of the splitting line 240.

Furthermore, it is possible to perform a classification of the external vehicle 1 depicted by the vehicle image 30, wherein a classification result of the classification is used to determine the spatial characterization. Moreover, the classification result can be used to determine a ratio between the width and the length of the depicted external vehicle 1, i.e., the side ratio.

Next, a projection of the mentioned vertical left and right side and the splitting line 240 relative to the ground surface 8 can be done, as represented in FIGS. 4 and 5. From this, the following computations are possible, where $\alpha_0$ is indicated by reference 300, $\alpha_1$ by reference 301, $\beta_0$ by reference 302, $\beta_1$ by reference 303, $c_0$ by reference 304 and $c_1$ by reference 305:

$$c_0/c_1 = r, \text{ with } r \text{ being the estimated side ratio} \tag{1}$$

$$\sin(\alpha_0) = c_0 \cdot \cos(\beta_0) \tag{2}$$

$$\sin(\alpha_1) = c_1 \cdot \cos(\beta_1) \tag{3}$$

$$\beta_0 + \beta_1 - \alpha_0 - \alpha_1 = \frac{\pi}{2} \tag{4}$$

and $$\beta_0 = \tan^{-1}\left(\tan(\alpha_0 + \alpha_1) + r \cdot \frac{\sin(\alpha_1)}{\sin(\alpha_0) \cdot \cos(\alpha_0 + \alpha_1)}\right).$$

From $\beta_0$ and the angle $\gamma$ between the z-axis and the left viewing direction it is possible to calculate the absolute orientation $\delta$ of the left side by $$\gamma + \beta_0 - \frac{\pi}{2}.$$

Next, for the 3D reconstruction, the left FOE can be calculated by $\tan(\delta)$ and the right FOE by $\tan$ $$\left(\delta + \frac{\pi}{2}\right).$$

According to FIG. 5, for the determination of the spatial characterization it is possible to perform a three-dimensional back projection of the depicted external vehicle 1 from the vehicle image 30. It can be assumed here that the horizontal 250 runs through the bounding box 230. In order to ascertain the height of the back projection, it can be assumed that the bounding box 230 touches the external vehicle 1 on top or bottom at the splitting line 240, if both FOE lie on different sides of the splitting line 240, as in FIG. 3. On the other hand, if both FOE lie on the left or right side, it can be assumed that the bounding box 230 touches the external vehicle 1 at upper and lower right, or at upper and lower left. Moreover, FIG. 5 shows the special case where only one side (front region 20, rear region 20 or side region 21) of the external vehicle 1 is visible. In this case, there is uncertainty amounting to half of the angle 301. In this case, it can be assumed that the external vehicle 1 is situated perpendicular to the angle bisector (dotted line).

The foregoing explanation of the embodiments describes embodiments in the context of examples. Of course, individual features of the embodiments, if technically feasible, can be freely combined with each other, without leaving the scope of the present disclosure.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for a spatial characterization of at least one vehicle image of image information, wherein the image information encompasses a vehicle image of an external vehicle and an environment image of an environment of the external vehicle, comprising:

determining a bounding box for the vehicle image, wherein the bounding box delimits the vehicle image from the environment image, determining a splitting line for the bounding box, wherein the splitting line partitions the vehicle image into at least a first portion and a second portion different from the first portion, wherein the first portion of the vehicle image includes a first side of the external vehicle, and the second portion of the vehicle image includes a second side of the external vehicle different from the first side the external vehicle, and determining the spatial characterization based on the bounding box and the splitting line, wherein the determining of the bounding box and the splitting line is based on machine learning techniques, wherein the spatial characterization is determined based on information indicating whether the second portion is situated right or left of the splitting line, and wherein the information indicating whether the second portion is situated right or left of the splitting line is a binary parameter having a first value indicating that the second portion is situated right of the splitting line and a second value indicating that the second portion is situated left of the splitting line.

2. The method according to claim 1, wherein the spatial characterization is performed as a three-dimensional reconstruction of the external vehicle from the vehicle image.

3. The method according to claim 1, wherein the bounding box is designed to separate the vehicle image from the environment image in order to fully mask the external vehicle.

4. The method according to claim 1, wherein the first portion of the vehicle image includes a front or a rear view of the external vehicle and the second portion of the vehicle image includes a side view of the external vehicle.

5. The method according to claim 1, wherein the splitting line is configured as a vertical line in relation to a ground surface on which the external vehicle is standing.

6. The method according to claim 1, wherein a classification of the external vehicle depicted by the vehicle image is performed, wherein a classification result of the classification is used for determining the spatial characterization.

7. The method according to claim 6, wherein the classification result is used to determine a ratio between width and length of the external vehicle.

8. The method according to claim 1, wherein a three-dimensional back projection of the external vehicle from the vehicle image is carried out for determining the spatial characterization.

9. The method according to claim 1, wherein determining the bounding box and the splitting line includes:

applying the machine learning techniques, in a form of at least one neural network, with the image information as input for the neural network, using at least one result from an application of the at least one neural network as the bounding box and as the splitting line, wherein the at least one result includes the information indicating whether the second portion is situated right or left of the splitting line.

10. The method according to claim 9, wherein the result comprises information about a position of the splitting line in relation to the bounding box.

11. The method according to claim 9, wherein the result comprises information as to a position of a side of the external vehicle relative to the splitting line.

12. The method according to claim 1, wherein the image information is recorded by a vehicle camera of another vehicle before determining the bounding box and the splitting line.

13. The method according to claim 12, wherein recording of the image information is performed during a drive to monitor the environment of the other vehicle in order to subsequently detect the external vehicle in the environment based on the bounding box and the splitting line.

14. The method according to claim 12, wherein the spatial characterization is performed in order to determine an orientation and/or a position of the external vehicle in relation to the other vehicle.

15. A non-transitory computer-readable medium having stored thereon instructions which, when executed by a processing device, cause the processing device to perform a method for a spatial characterization of at least one vehicle image of image information, wherein the image information encompasses a vehicle image of an external vehicle and an environment image of an environment of the external vehicle, the method comprising:

determining a bounding box for the vehicle image, wherein the bounding box delimits the vehicle image from the environment image, determining a splitting line for the bounding box, wherein the splitting line partitions the vehicle image into at least a first portion and a second portion different from the first portion, wherein the first portion of the vehicle image includes a first side of the external vehicle, and the second portion of the vehicle image includes a second side of the external vehicle different from the first side the external vehicle, and determining the spatial characterization based on the bounding box and the splitting line, wherein the determining of the bounding box and the splitting line is based on machine learning techniques, wherein the spatial characterization is determined based on information indicating whether the second portion is situated right or left of the splitting line, and wherein the information indicating whether the second portion is situated right or left of the splitting line is a binary parameter having a first value indicating that the second portion is situated right of the splitting line and a second value indicating that the second portion is situated left of the splitting line.

* * * * *